(12) United States Patent
Eyfa

(10) Patent No.: US 9,500,411 B2
(45) Date of Patent: Nov. 22, 2016

(54) BURNER AND/OR INJECTOR PANEL APPARATUS, METHODS OF INSTALLATION AND USE OF THE SAME IN A METAL-MELTING FURNACE, AND METAL-MELTING FURNACE INCLUDING THE SAME

(71) Applicant: Air Liquide Advanced Technologies U.S. LLC, Houston, TX (US)

(72) Inventor: Yury Eyfa, Smyrna, GA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 0 days.

(21) Appl. No.: 14/749,052

(22) Filed: Jun. 24, 2015

(65) Prior Publication Data

US 2015/0292801 A1   Oct. 15, 2015

Related U.S. Application Data

(62) Division of application No. 13/038,315, filed on Mar. 1, 2011, now abandoned.

(51) Int. Cl.
*F27B 3/20* (2006.01)
*C21C 5/52* (2006.01)
(Continued)

(52) U.S. Cl.
CPC ............. *F27B 3/205* (2013.01); *C21B 13/12* (2013.01); *C21C 5/5217* (2013.01); *F27B 3/085* (2013.01);
(Continued)

(58) Field of Classification Search
CPC ...... C21C 5/5217; F27B 3/205; F27B 3/225; F27B 3/085; F27D 1/12; F27D 99/0033; C21B 13/12; Y02P 10/216; Y10T 29/49826
USPC ....... 29/428; 373/60, 72; 431/159, 168, 181, 431/189
See application file for complete search history.

(56) References Cited

U.S. PATENT DOCUMENTS

| 3,100,461 A | 8/1963 | Eyfa |
| 3,451,456 A * | 6/1969 | Dey ........................ F16B 39/28 411/166 |

(Continued)

FOREIGN PATENT DOCUMENTS

| DE | 89 08 577 | 9/1989 |
| EP | 1 835 039 | 9/2007 |
| JP | 11 037663 | 2/1999 |

OTHER PUBLICATIONS

Kotraba, Norman L., "Oxy-fuel burner experience at Georgetown Steel Corp.", Iron and Steel Engineer, vol. 61, No. 12, Dec. 1, 1984, pp. 17-19.

(Continued)

*Primary Examiner* — Dana Ross
*Assistant Examiner* — James Sims, III
(74) *Attorney, Agent, or Firm* — Christopher J. Cronin

(57) ABSTRACT

A burner and/or injector panel apparatus includes a flange rotatable within a cylindrical aperture in a horizontal plate and securely retainable between one or more retaining clips and the plate. Extending downward from the flange is a main body with a cylindrical chamber. A burner, burner/injector, or injector is contained within the cylindrical chamber. The main body has a helical cooling circuit extending around the cylindrical chamber and burner and/or injector. The burner and/or injector panel apparatus may be installed through a furnace wall, especially an electric arc furnace, more particularly, a balcony panel of a sump area of an electric arc furnace. The burner and/or injector panel apparatus may be tilted from horizontal or rotated around its vertical axis in order to better target a target area of a molten bath of metal with a flame, jet of oxygen, or stream of carbon particles.

12 Claims, 6 Drawing Sheets

(51) Int. Cl.
*F27B 3/22* (2006.01)
*F27D 1/12* (2006.01)
*C21B 13/12* (2006.01)
*F27B 3/08* (2006.01)
*F27D 99/00* (2010.01)

(52) U.S. Cl.
CPC ............. *F27B 3/225* (2013.01); *F27D 1/12* (2013.01); *F27D 99/0033* (2013.01); *Y02P 10/216* (2015.11); *Y10T 29/49826* (2015.01)

(56) References Cited

U.S. PATENT DOCUMENTS

| | | |
|---|---|---|
| 4,622,007 A | 11/1986 | Gitman |
| 4,703,336 A | 10/1987 | Ovshinsky et al. |
| 5,166,950 A | 11/1992 | Jouvaud et al. |
| 5,373,530 A | 12/1994 | Perrin |
| 5,444,733 A | 8/1995 | Coassin et al. |
| 5,471,495 A | 11/1995 | Berger et al. |
| 5,599,375 A | 2/1997 | Gitman |
| 5,788,921 A | 8/1998 | Gitman et al. |
| 5,802,097 A | 9/1998 | Gensini et al. |
| 5,858,302 A | 1/1999 | Gitman et al. |
| 5,906,119 A * | 5/1999 | Boillet .............. C03B 5/2353 432/196 |
| 6,212,218 B1 | 4/2001 | Shver |
| 6,289,035 B1 | 9/2001 | Shver |
| 6,342,086 B1 | 1/2002 | Shver |
| 6,372,010 B1 | 4/2002 | Shver et al. |
| 6,614,831 B2 | 9/2003 | Shver |
| 6,999,495 B2 | 2/2006 | Popenov et al. |
| 2003/0000338 A1* | 1/2003 | Shver ................ C21C 5/462 75/10.41 |
| 2004/0134794 A1 | 7/2004 | Sundaram et al. |
| 2004/0174920 A1* | 9/2004 | Popenov ............ C21C 5/5217 373/63 |

OTHER PUBLICATIONS

EP Search Report for EP 12 15 7600 dated Jun. 15, 2012.

* cited by examiner

BURNER AND/OR INJECTOR PANEL APPARATUS, METHODS OF INSTALLATION AND USE OF THE SAME IN A METAL-MELTING FURNACE, AND METAL-MELTING FURNACE INCLUDING THE SAME

CROSS REFERENCE TO RELATED APPLICATIONS

The present application is a continuation/divisional application of U.S. application Ser. No. 13/038,315 filed Mar. 1, 2011, which is being incorporated by reference herein in its entirety for all purposes.

BACKGROUND

The present invention relates to a burner and/or injector panel apparatus, methods of installation and use of the same in a metal-melting furnace, and metal-melting furnace including the same. More particularly, the present invention relates to a sump burner and/or injector panel apparatus, methods of use and installation of the same in a sump area of an electric arc furnace, and an electric arc furnace including the same.

One type of metallurgical process, steelmaking, is very well developed. In general, an electric arc furnace (EAF) is used to make steel by application of an electric arc to melt one or more of scrap metal and/or other alternative iron bearing feed stocks and alloys that are placed within the furnace. One type of EAF has hemispherical lower bowl made of metal. The bottom and sides of the lower bowl are lined with a refractory material forming the hearth. Extending vertically from the bowl are water-cooled sidewalls. Extending between the sidewalls over a molten bath of metal (contained by hearth) is a roof. Electrodes extend through the roof and into the bath. EAFs of the eccentric bottom tapping (EBT) type also include a sump area which is lined with refractory material. The sump area serves the function of containing the molten steel as it is poured from the EAF through a tapping hole.

Generally speaking, scrap metal, or charges, are dumped into the EAF through an opening. Typically these charges further include carbon particulate and other slag forming materials. Other known processes comprise using a ladle for hot or heated metal from a blast furnace and inserting it into the EAF furnace, such as by injection of the DRI by a lance.

There are numerous phases of charge processing in an EAF furnace and/or an EAF-like furnace.

In the melting phase, the electric arc and burners melt the charge burden into a molten pool of metal (melted metal), called an iron carbon melt, which accumulates at the bottom or hearth of the furnace. Thermal energy beyond that supplied by the arc may be provided by burners radially distributed around the furnace. Slag formers such as calcium oxide or magnesium oxide are sometimes injected into the molten pool with one or more injectors.

Most commonly, after melting the charge, an electric arc furnace proceeds to a refining and/or decarburization phase. In this phase, the metal melt continues to be heated by the arc until slag forming materials combine with impurities in the iron carbon melt and rise to the surface as slag. When the iron carbon melt reaches a critical temperature which allows a carbon boil, the charged carbon in the melt combines with any oxygen present in the bath to form carbon monoxide bubbles which rise to the surface of the bath, forming foaming slag. The foaming slag acts as an insulator throughout the furnace.

Further heating and processing is realized by a decarburization process wherein, in typical embodiments of the prior art utilizing advanced or more modern EAF techniques, a high velocity, usually supersonic, flow(s) of oxygen is blown into the metal bath with either lances or burner/lances to decarburize the bath by oxidation of the carbon contained in the bath, forming CO and/or $CO_2$ when combined with the available or excess carbon in the bath. The burner(s)/lance(s) act to more uniformly melt the charge and lessen, or prevent, overheating and minimize the time required for the melt and time that the arc is created.

By injecting the metal bath or liquid metal with oxygen, the dissolved carbon content of the bath can be reduced to a selected or reduced level. It is commonly regarded that if an iron carbon melt is under 2% carbon, the melt becomes steel. EAF steel making processes typically begin with burdens having less than 1% carbon. The carbon in the steel bath is continually reduced until it reaches the content desired for producing a specific grade of steel, such as, for example, and not by way of limitation, down to less than 0.1% for low carbon steels.

Additional chemical energy in the form of carbon or coke particles may also be injected by an injector. Alternatively, a single apparatus (burner/injector) may be used to provide the flame and inject particulate carbon/coke or other slagging materials. Typically, the carbon or coke flow is injected with the aid of a fluidizing gas flow of compressed air, natural gas, nitrogen, and/or the like.

Collectively, burners, lances, injectors, burner/lances, and burner/injectors may be referred to as burners and/or injectors.

One of the problems associated with EAFs is the existence of cold spots. The charged scrap or charge rapidly melts at hot spots located at regions of highest electric current density, but often remains un-melted at cold spots located at regions of lowest electric current density). This creates harsh conditions for the portion of the furnace wall and refractory lining located at the hot spots due to excessive exposure to heat from the arc during the latter portions of the melt down cycle. Scrap located in the cold spot regions receives heat from the arc at a reduced rate during the melt down cycle, thereby creating the cold spots. To melt charge scrap in the cold spots, flames from burner and/or injector apparatuses are directed towards the cold spots.

The cold spots are typically formed in areas further away from the furnace arc as scrap located in these areas receives electrical energy at a reduced rate per ton of scrap. One example of a cold spot is the region in line with a bisection of the angle between the electrodes where current density is relatively lower. Another example of a cold spot is the sump area which includes the tapping spout, due to its location away from the arc. Still another cold spot occurs at the slag door due to excessive heat losses to ambient air which infiltrates through this area. An even further common source for cold spots in furnaces occurs at the places where additional materials are injected, such as slag forming material, direct reduced iron, lime, etc., (which is inserted through a slag door or through an opening in the furnace side wall) due to the heat consumption of these materials as they melt down.

Prior art solutions to these challenges have been to incorporate additional burners and/or injectors around the furnace that target the cold spots. Electric arc furnaces equipped with burners and/or injectors located at cold spots have improved uniformity of scrap melting and have reduced build-ups of materials at the cold spots. Their location is chosen to avoid further overheating of hot spots that result from the rapid melting of scrap located between the electrode and the furnace shell. More specifically, the burners and/or injectors are located as far away from hot spots as is practically possible and the burner flame outlet opening direction is chosen so that flame penetration occurs predominantly into the scrap pile located at the cold spots and not to already heated portions of the furnace.

The burners and/or injectors are typically radially distributed around the furnace. Because the sump area is flooded with molten metal during tapping, burners and/or injectors are not installed in the sidewalls. Rather, these sump burners and/or injectors are inserted through and mounted to a balcony panel which forms a ceiling over the sump area. The balcony panel is rigidly attached to the sidewalls and may be distinguished from the EAF roof which is retractable from the sidewalls.

Burners and/or injectors are subjected to harsh conditions in EAFs, including intense radiative heat, convective heat transfer from hot furnace gases, slagging caused by splashing slag, and blowback of injected oxygen. In order to prolong the useful life of such burners and/or injectors, they are often mounted in panels that at least partially shield them from such harsh conditions. The panels are sometimes water-cooled.

Collectively, a burner, lance, burner/lance, injector, burner/lance/injector, or burner/injector mounted in such a panel may be referred to as burner and/or injector panel apparatus.

Typically, oxygen injection for the decarburization must wait until the melting phase of the process is substantially complete before starting high velocity injection of oxygen. This is since the burners cannot effectively deliver high velocity oxygen before then because some portions of unmelted charge may exist between the burners/lances and the liquid metal or metal melt. The oxygen flow would be deflected, potentially causing severe damage to the furnace and burner/injector panel.

This fact is further aggravated by the generally spherical shape of most EAF furnace structures. Melting of the metal typically occurs in the middle, lower portion of the melt and expands to fill the sides. Early in the melting phase a high velocity oxygen stream has less effect and/or ability to penetrate a not fully melted charge (metal) to decarburize the metal melt.

The same philosophy that is used in selecting the location of additional burner panel apparatuses is used to select the location of other injector apparatuses or burner/injectors for use in decarburization. When located adjacent the cold spots, the exothermic energy of melt refining can be used more effectively to melt the scrap without overheating the hot spots.

The discharge velocity of the oxygen stream from the burner and/or injector apparatus is to be chosen to allow the injected jet of oxygen to penetrate the slag and to react with the iron-carbon melt without excessive molten metal splashing on the furnace walls and electrode(s). However, inadvertent metal splashing does occur and is a common cause of apparatus failure. Those skilled in the art understand that the angle formed by the jet of oxygen and the horizontal slag surface (termed angle of attack) must not be too small or the injected jet of oxygen may not penetrate into the slag deeply enough. They further understand that the angle of attack must not be too great or blow back may occur with damage to the burner and/or injector apparatus.

Combined injection of carbon and oxygen via various apparatus, including dedicated lances in and around the furnace wall has become a common practice for adding extra heat to the process. Typically, the supply of carbon flow for injection is obtained from a carbonaceous material dispenser, such as a compressed gaseous carrier comprising compressed air, natural gas, nitrogen, and/or the like.

The use of the burners together with carbon and oxygen lances has allowed electric steelmakers to substantially reduce electrical energy consumption and to increase furnace production rate due to the additional heat input generated by the oxidation of carbon, and by significant increases in electric arc thermal efficiency achieved by the formation of a foamy slag layer that insulates the electric arc from heat losses. The foamy slag also stabilizes the electric arc and therefore allows for a higher electrical power input rate. The foamy slag layer is created by CO bubbles which are formed by the oxidation of injected carbon to CO. The increased flow of injected carbon creates increased localized CO generation. Accordingly, most EAF furnace units also comprise a post production means for removing or reducing CO levels in the off gas such as post-combustion burners. Mixing of the CO with oxygen inside of the electric arc furnace is desirable but very difficult to arrange without excessive oxidation of the slag and electrodes. Accordingly, the art field has developed postproduction means for treating the high CO content of the off gas.

Most modern electric arc furnaces are equipped with all or some of the above-mentioned means for auxiliary thermal and/or chemical energy input. Along with improvements in the design and operation of metal melting furnaces have come improvements in panel design. For example, various burner panel configurations are disclosed in U.S. Pat. No. 4,703,336; U.S. Pat. No. 5,444,733; U.S. Pat. No. 6,212,218; U.S. Pat. No. 6,372,010; U.S. Pat. No. 5,166,950; U.S. Pat. No. 5,471,495; U.S. Pat. No. 6,289,035; U.S. Pat. No. 6,614,831; U.S. Pat. No. 5,373,530; U.S. Pat. No. 5,802,097; U.S. Pat. No. 6,999,495; and U.S. Pat. No. 6,342,086. Such prior art patents have proven to be beneficial. For example, U.S. Pat. No. 6,999,495 has found wide applicability for increasing spatial energy coverage in a furnace. Likewise, U.S. Pat. No. 6,614,831 has found applicability in extending the reach of various tools, such as a burner or a lance, into the interior of a furnace.

Because sump burner and/or injector panel apparatuses are installed outside of the furnace area enclosed by the hearth, they are located a relatively greater distance from the surface of the molten metal and cold spots. Because the flame, oxygen jet, or particle stream must reach farther before it reaches the molten metal or cold spot, the jet becomes relatively less coherent in comparison to jets which are injected from relatively closer locations. Thus, the flame, oxidant, or particles are no longer directed to a relatively small area and the effectiveness of the jet is very limited. Thus, there is a need for improved sump burner and/or injector apparatuses and methods and furnaces using the same that do not suffer from as much loss of jet coherence.

Many configurations currently exist for burner and/or injector panel apparatuses. For sump burner and/or injector panel apparatuses, they are typically mounted and located outside the hearth area on the top of the sump in the balcony panel. These sump burner and/or injector panel apparatuses have a fixed position. Thus, the direction of the flame, or injection of the oxidant or particles is fixed and may not be easily changed. More specifically, the angular orientation of the apparatus in each of the x, y, and z axes is fixed. If the direct causes the flame, oxidant or particles to be oriented or injected outside of the target area of the bath, the furnace must be shut down and the burner and/or injector panel apparatus uninstalled from the balcony panel. This requires careful removal or refractory plastic and a significant amount of furnace downtime. It must then be reinstalled in an orientation that achieves the desired flame or injection direction. If the opening in the balcony panel is not large enough to allow the burner and/or injector panel apparatus to be reinstalled with the correct orientation, the opening in the balcony panel must be modified. This requires greater capital investment and a lengthier furnace downtime. Thus, there is a need to provide sump burner and/or injector panel apparatuses that avoid these problems.

Various techniques have been designed for cooling panels that are used in EAFs. One type of cooling means is an empty cavity, the inside of which is sprayed with cooling water. Another type of cooling means is a serpentine conduit of cooling water that traverses from left to right and back along a plane that is typically oriented at a right angle to the slag layer. While these often achieve a fully satisfactory cooling effect, such bulky devices result in an overly large, heavy, and expensive panel body. Thus, there is a need for an improved sump burner and/or injector panel apparatuses that avoid these problems.

SUMMARY

There is disclosed a burner and/or injector panel apparatus for use in metal melting furnaces, comprising: a horizontal plate having a lower surface, an upper surface, and a vertically oriented cylindrical aperture extending through said upper and lower surfaces; a horizontally extending flange having a uniform height along its periphery, a width or diameter of said flange being greater than a diameter of said cylindrical aperture; a main body integrally formed with said flange and extending downwardly therefrom along a main body axis at an angle to a vertical axis of said flange, said main body having a centrally disposed cylindrical chamber extending upper and lower ends thereof; and a burner and/or injector inserted in said main body cylindrical chamber adapted and configured to inject therefrom at least one of a flame, a jet of oxygen, and a stream of carbon particles. Said integrally formed flange and main body are operatively associated with said plate such that: said flange is capable of resting atop said plate while said main body projects downwardly though said cylindrical aperture. Said integrally formed main body is rotatable within said cylindrical aperture while said flange is rotatable atop said plate. Said plate is adapted and configured to retain said plate in fixed position.

There is also provided an electric arc furnace installation, comprising: a furnace having a hearth adapted and configured to contain a bath of molten metal; a sump region with a tap hole; sidewalls extending upwardly and around said hearth and sump region; a balcony panel extending horizontally over said sump region and having a cylindrical opening; and the above-provided burner and/or injector panel apparatus, wherein said plate is secured to an exterior surface of said balcony panel, said cylindrical aperture is aligned with said balcony panel cylindrical opening, and said main body extends downwardly through said balcony panel cylindrical opening.

There is also provided a method of installing the above provided burner and/or injector panel apparatus in an electric arc furnace having a balcony panel extending horizontally over a sump region, the balcony panel having a cylindrical opening. The method comprises the following steps. Said plate is secured to an exterior of the balcony panel with an axis of said cylindrical aperture being aligned with an axis of said cylindrical opening. Said main body is inserted through said cylindrical aperture and said cylindrical opening while nestling said flange atop said plate. Said integrally formed flange and main body is rotated until said burner and/or injector is pointing towards a desired target area in said sump region. Said flange is secured to said plate to arrest rotation of said flange with respect to said plate.

There is also provided a method of using the above-provided electric arc furnace installation. The method comprises the following step. At least one of fuel and oxidant, oxygen, and carbon particles is injected from said burner and/or injector.

The burner and/or injector panel apparatus, electric arc furnace installation, method of installation, and/or method of use may include one or more of the following aspects:

- the burner and/or injector panel apparatus further comprises one or more fasteners and one or more retaining clips corresponding to said one or more fasteners, wherein said plate further comprises one or more studs corresponding to said one or more retaining clips upwardly projecting from an upper surface of said plate, said clips being adapted and configured to be fastened to said studs with said fasteners so as to fixedly secure said flange between said plate and said one or more clips.
- said integrally formed flange and main body include a cooling circuit having a helically shaped portion in said main body extending around said cylindrical chamber.
- said main body has a cylindrical configuration coaxial with said cylindrical chamber.
- said flange has a cylindrical configuration and said flange diameter is greater than a diameter of said cylindrical aperture.
- said burner and/or injector comprises a burner.
- said burner and/or injector comprises an oxygen injector.
- said burner and/or injector comprises a burner and an oxygen injector.
- said burner and/or injector comprises a carbon particle injector.
- said burner and/or injector comprises a burner and a carbon particle injector.
- said burner and/or injector comprises a burner, an oxygen injector, and a carbon particle injector.
- the method of installation further comprising the step of connecting at least one of a source of fuel and oxidant, a source of oxygen, and a source of carbon particles to said burner and/or injector.
- the burner and/or injector panel apparatus further comprises one or more fasteners and one or more retaining clips corresponding to said one or more fasteners, wherein said plate further comprises one or more studs corresponding to said one or more retaining clips upwardly projecting from an upper surface of said plate and said method comprises the further step of fastening said one or more clips to said one or more studs with said one or more fasteners so as to fixedly secure said flange between said plate and said one or more clips.
- the method of installation, wherein:
    the main body includes a helically shaped cooling circuit extending around said cylindrical chamber; and
    said method comprises the further step of connecting the cooling circuit to a supply of cooling water.
- the method of installation, wherein the pitch and/or roll angle is adjusted by a clearance adjustment device.

the method of installation further comprises the step of adjusting the pitch and/or roll angle of the flange with respect to the plate by adjusting a clearance in between said flange and plate at one or more circumferential portions thereof.

the method of installation, wherein the pitch and/or roll angle is adjusted by driving one or more wedges in between said flange and plate at one or more circumferential portions thereof.

the method of installation, wherein the pitch and/or roll angle is adjusted by tightening or loosening one or more threaded fasteners threadingly engaged in said flange and which also bear against an upper surface of said plate to increase or decrease, respectively, a clearance in between said flange and plate at one or more circumferential portions thereof.

said burner and/or injector comprises a burner and fuel and an oxidant are injected from said burner to combust within an interior of said electric arc furnace.

said burner and/or injector comprises an oxygen injector and oxygen is injected from said oxygen injector into a molten metal bath in said electric arc furnace.

said burner and/or injector comprises a combined burner and oxygen injector.

fuel and an oxidant are injected from said burner to combust within an interior of said electric furnace.

oxygen is injected from said oxygen injector into a molten metal bath in said electric arc furnace.

said burner and/or injector comprises a combined burner, oxygen injector, and carbon particle injector.

fuel and an oxidant are injected from said burner to combust within an interior of said electric furnace.

oxygen is injected from said oxygen injector into a molten metal bath in said electric arc furnace.

carbon particles are injected from said carbon particle injector into said molten metal bath.

the fuel is natural gas, propane, or fuel oil.

the oxidant is oxygen, air or a mixture of oxygen and air.

a surface of the flange adapted to face an interior of a furnace is covered with soft refractory.

the integrally formed flange and main body are formed of copper or copper alloy.

the sump area is crescent shaped.

said balcony panel is crescent shaped.

the electric arc furnace includes a lower shell surrounding said hearth.

the method of use further comprises the step of adding a charge to the electric arc furnace.

the method of use further comprises the step of withdrawing molten steel from the electric arc furnace.

the flange has one or more curved slots formed from an upper surface through a lower surface in a circumferential portion thereof, wherein:
  said plate has threaded holes accessible through the curved slots,
  one or more bolts may be inserted into said one or more slots and threaded into the corresponding hole(s) in said plate, and
  tightening said one or more bolts allow said flange to be rigidly secured to said plate.

the cooling circuit comprises an inlet formed in an upper surface of said flange, a downward leg fluidly communicating with said inlet and extending vertically downward through a peripheral portion of said main body, a helical portion fluidly communicating with said downward leg that is formed in a circumferential portion of said main body around the cylindrical chamber in between said cylindrical chamber and said downward leg, a return leg fluidly communicating with said helical portion, and an outlet fluidly communicating with said helical portion.

an axis of said flange forms an angle $\alpha$ with an axis of said main body.

said flange is adapted and configured to allow up to 360° of rotation on top of said plate.

a diameter of said cylindrical aperture of said plate is large enough to allow said integrally formed flange and main body to be rotated up to 360° without the main body impinging upon an inner surface of the opening in the balcony panel.

a diameter of said cylindrical aperture of said plate is large enough to allow said clearance adjustment device to tip said integrally formed flange and main body to its side without said main body impinging upon an inner surface of said opening in said balcony panel.

a diameter of said flange is greater than a diameter of said cylindrical aperture formed in said plate and said opening in said balcony panel, wherein a difference between said flange diameter and said aperture and opening diameters allows said flange to be rotated within said aperture without said integrally formed flange and main body falling into said furnace.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

The words and phrases used herein should be given their ordinary and customary meaning in the art by one skilled in the art unless otherwise further defined.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
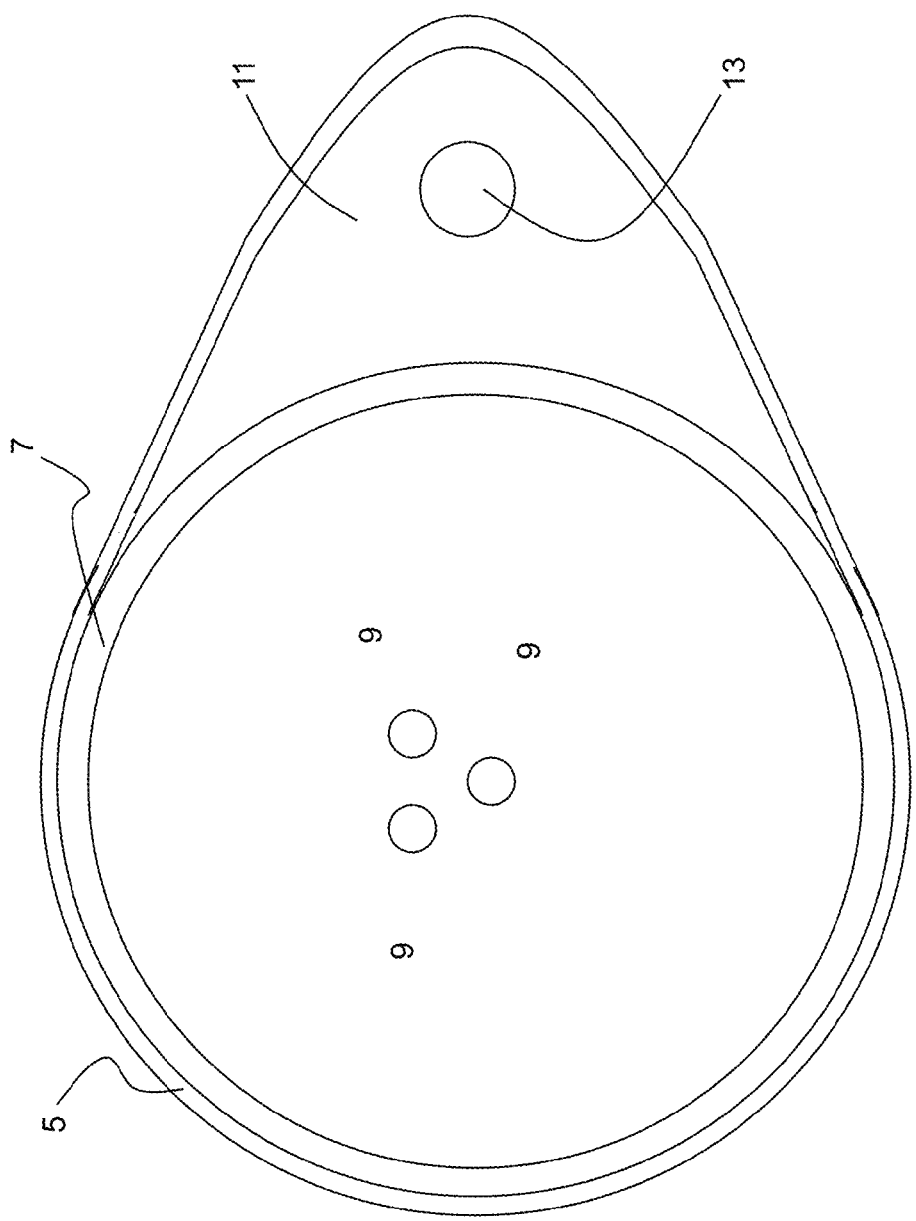
FIG. 1 is a top plan view of an inventive furnace with a sump burner and/or injector panel apparatus.
Figure 2:
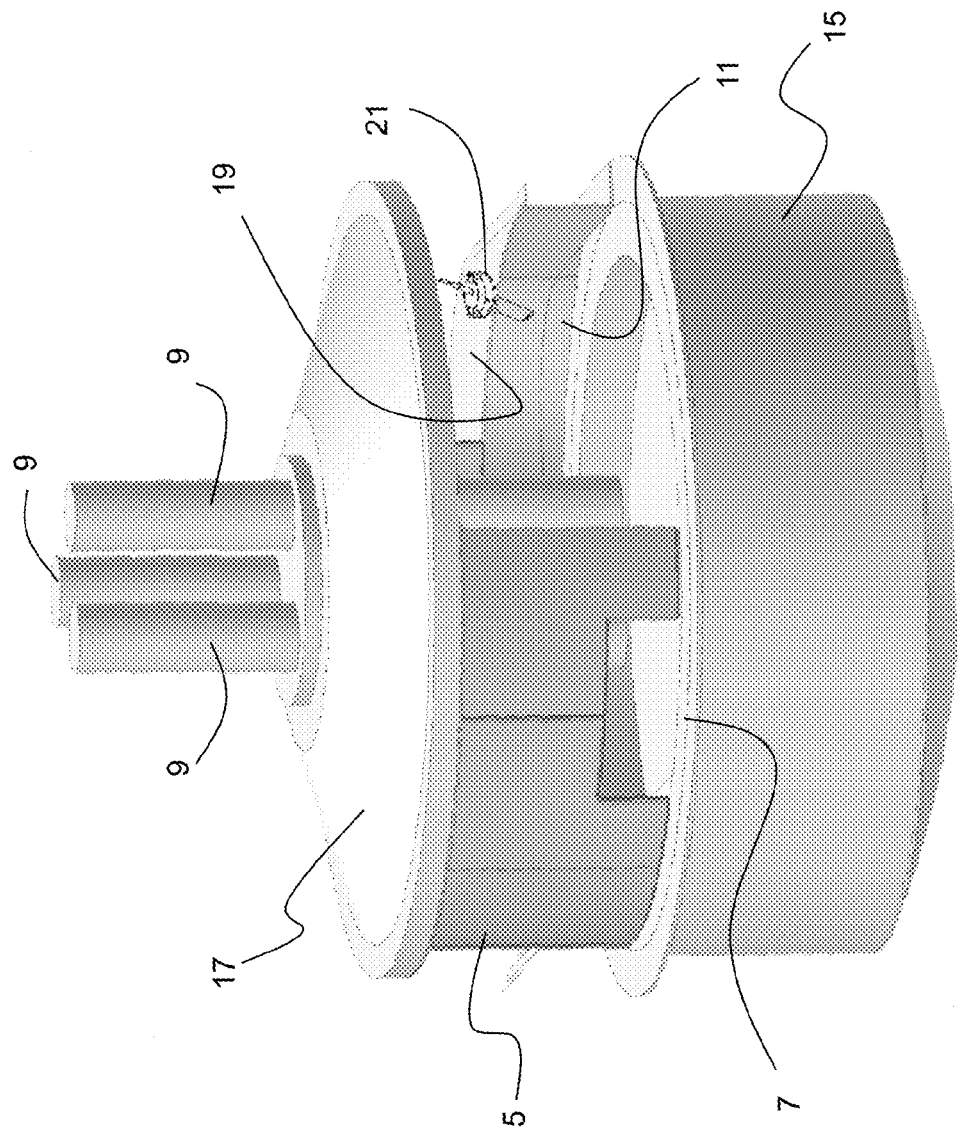
FIG. 2 is a perspective view of the furnace of FIG. 1 with parts removed.
Figure 3:
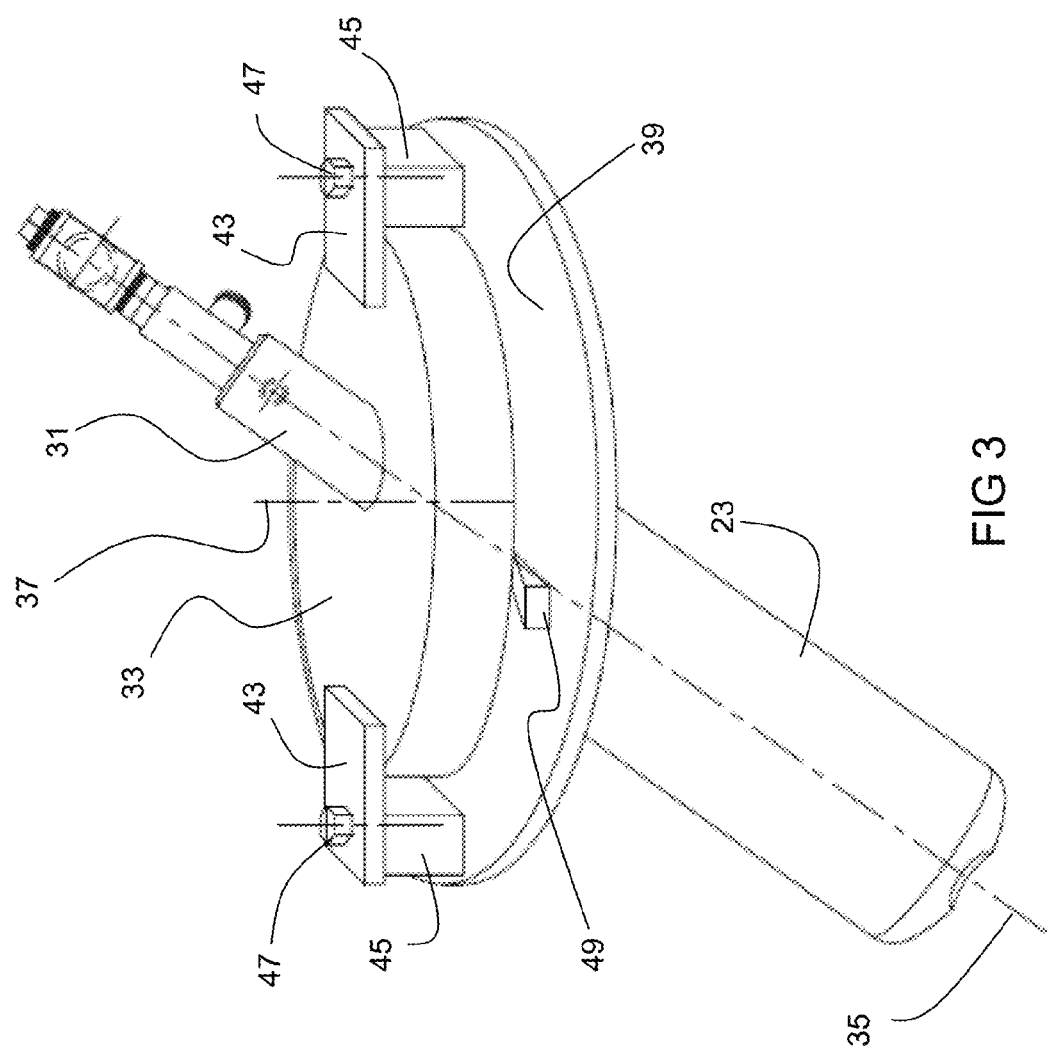
FIG. 3 is a perspective view of a burner and/or injector panel apparatus of the present invention.
Figure 4:
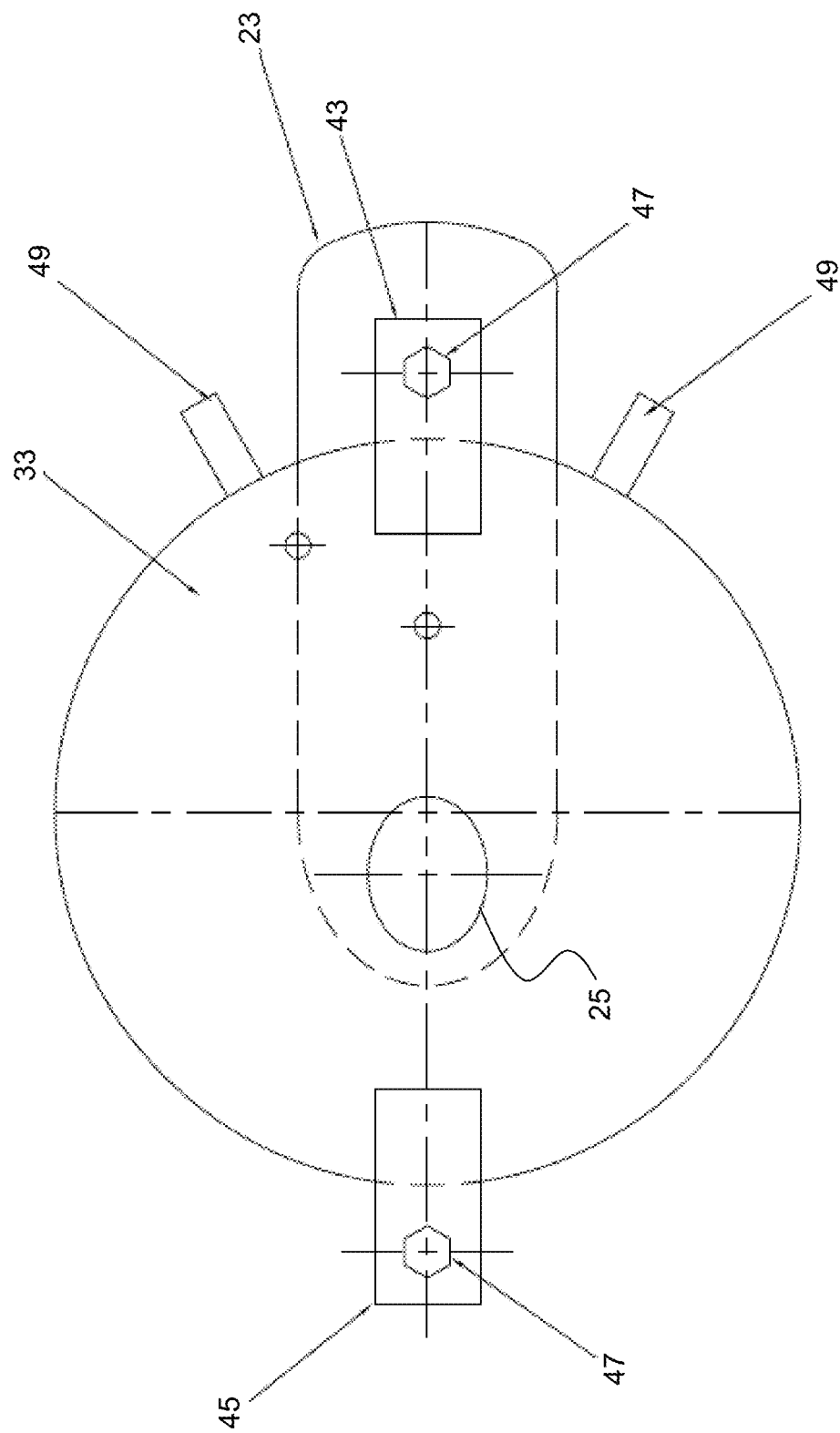
FIG. 4 is a top plan view of the burner and/or injector panel apparatus of FIG. 3 illustrating hidden parts.
Figure 5:
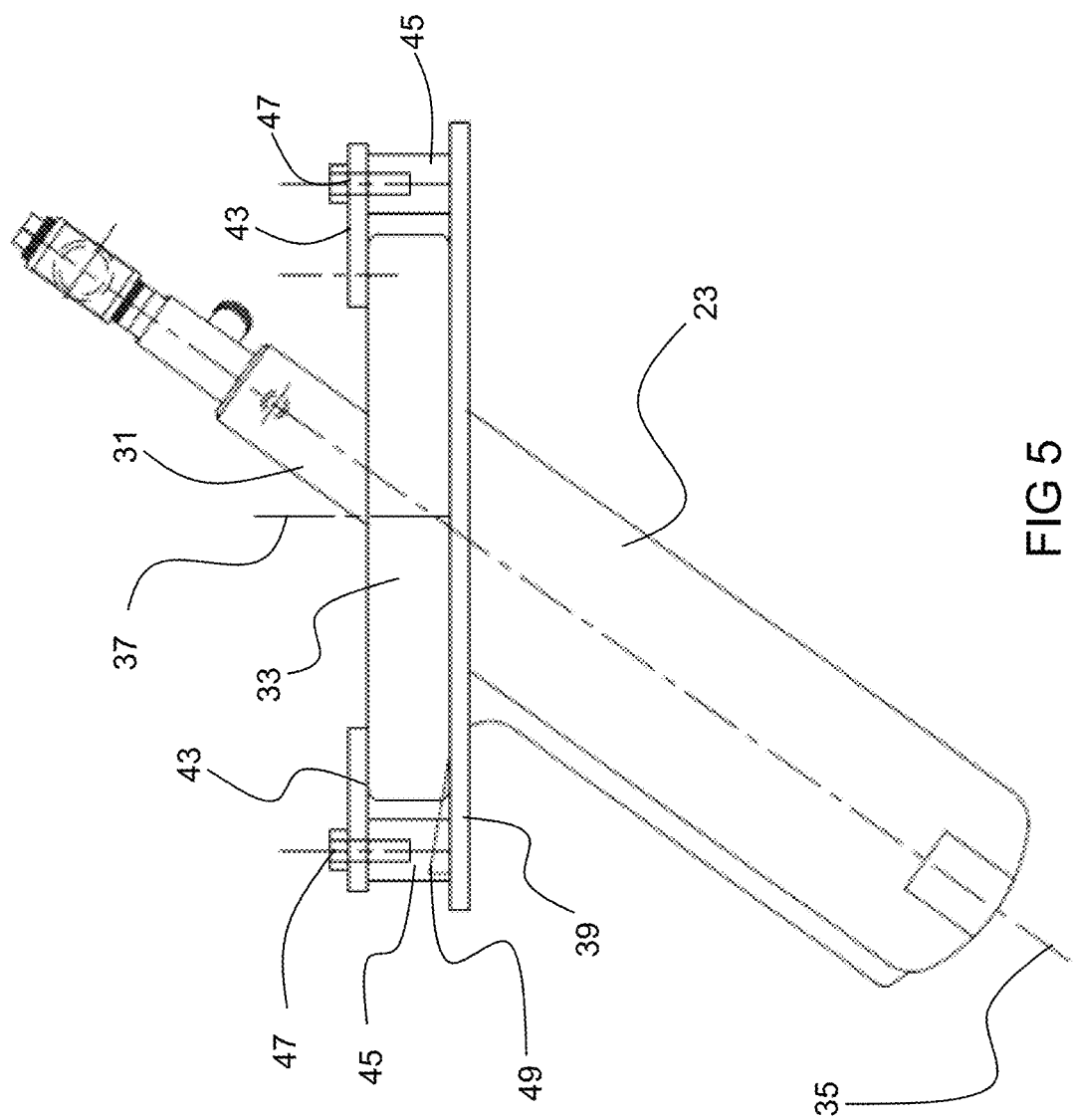
FIG. 5 is an elevation view of the burner and/or injector panel apparatus of FIG. 3.
Figure 6:
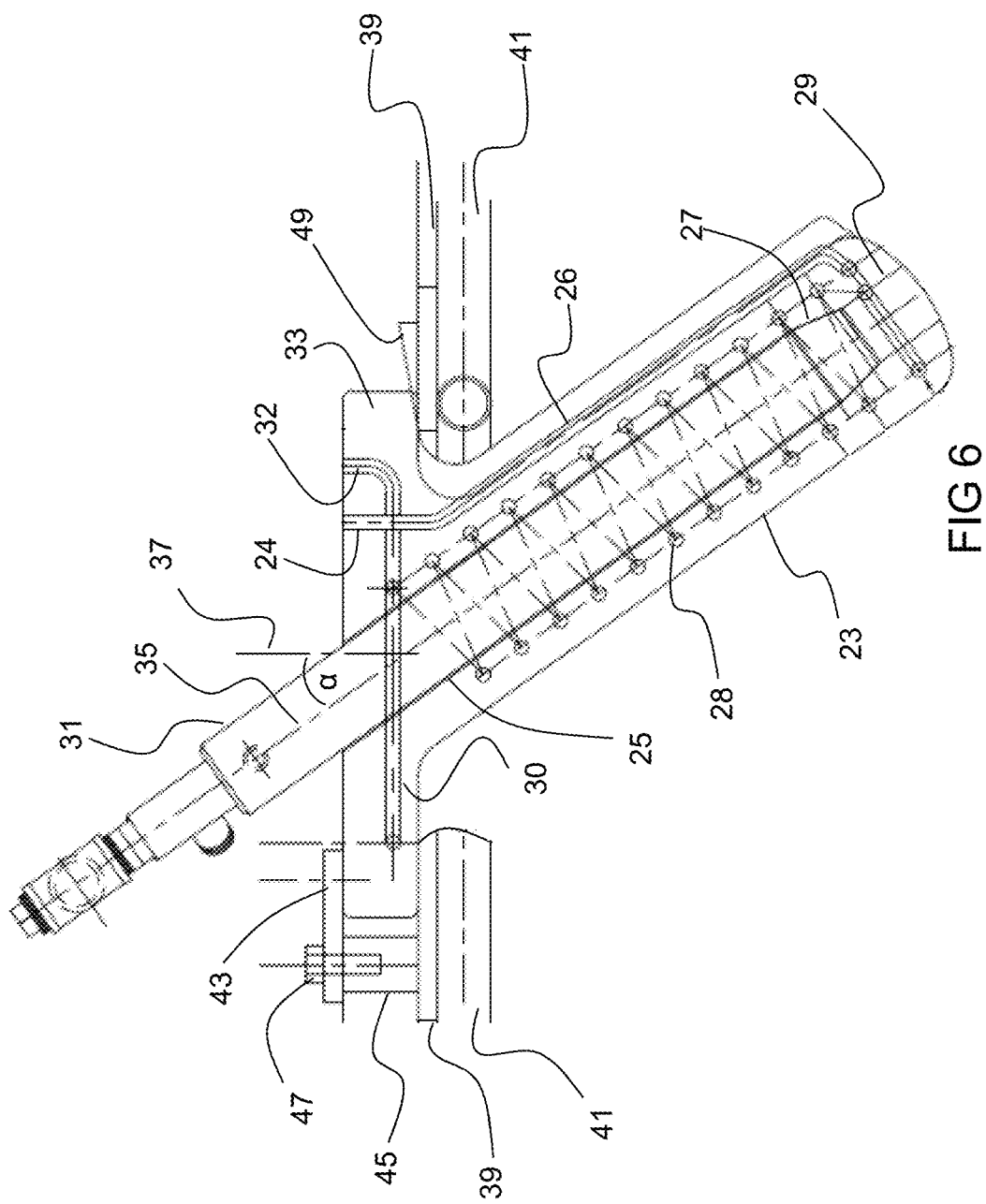
FIG. 6 is a cross-sectional view of the burner and/or injector panel apparatus of FIG. 3.

As best illustrated in FIGS. 1-2, an electric arc furnace (EAF) according to the invention includes a hearth 7 of ceramic material lining a lower shell 15 of metal. The hearth 7 is configured and adapted to contain a molten bath of metal. Disposed above the lower shell 15 is an upper shell comprising sidewalls 5 extending upwardly from adjacent a peripheral portion of the hearth 7. Extending across top portions of sidewalls 5 is a retractable roof 17. Three electrodes 9 extend through roof 17 and into the molten bath. A sump area 11 is lined with refractory material and includes a tapping hole 13. The sump area 11 is typically crescent shaped. A lower portion of the sidewalls 5 adjacent a peripheral edge of the sump area 11 do not extend as high as other portions of the sidewalls 5 not adjacent the sump area 11. Rather, they extend only partially upward to meet at a peripheral arcuate edge of balcony panel 19. The balcony panel 19 provides a ceiling over the sump area 11. An upper portion of sidewalls 5 adjacent the sump area 11 extends from the arcuate edge of balcony panel 19 closest to the hearth 7 upwardly towards roof 17.

Installed through an opening in balcony panel 19 is a burner and/or injector panel apparatus 21. The burner and/or injector panel apparatus 21 may be positioned and oriented in such a way as to direct a flame towards scrap or charge in the sump area 11 or towards the metal bath adjacent the sump area 11. The burner and/or injector panel apparatus 21 may be positioned and oriented in such a way as to direct a flame of fuel and oxidant or inject oxygen and/or carbon particles into a desired target area of the molten metal bath adjacent the sump area 11.

The burner and/or injector panel apparatus 21 includes a flange 33 disposed at an upper end thereof that is integrally formed with a main body 23 disposed at a lower end thereof. An axis 37 of the flange 33 forms an angle α with an axis 35 of body 23. Extending through the flange 33 and the body 23 along the axis 35 is a cylindrical chamber 25. Flange 33 rests upon a plate 39. Plate 39 includes cylindrical aperture that is sized to correspond to an opening in water-cooled panel 41. Plate 39 also includes one or more upwardly projecting studs 45 and one or more corresponding retaining clips 43 secured to studs 45 with one or more corresponding fasteners 47. The plate 39, projecting stud(s) 45 and retaining clip(s) 43 may be made of any metal or metal alloy suitable for metal melting furnaces.

Alternatively, instead of studs 45, clips 43, and fasteners 47, the flange 33 could be provided with curved slots in a circumferential portion thereof. Accessible through the curved slots could be holes threaded in the plate 39. One or more bolts could be inserted into one or more slots and threaded into the corresponding hole in plate 39. Tightening the bolt would allow the flange 33 to be rigidly secured to the plate 39.

The flange 33 and main body 23 also includes a cooling circuit having an inlet 24, a downward leg 26 which leads to a helical portion 28 formed in a circumferential portion of body 23 around the cylindrical chamber 25. A terminal end of the helical portion 28 leads to a return leg 30 which in turn leads to an outlet 32. The water-cooled flange 33 and main body 23 may be formed of any metal or metal alloy suitable for use in metal-melting furnaces, especially EAFs. Typically, it is made of copper or copper alloy. The under surface of flange 33 exposed to furnaces gases is typically covered with a soft refractory material.

The co-axial cylindrical chamber 25 may have a constant diameter from its upper end to its lower end. Typically, it has a larger inside diameter over most of the length of the cylindrical body 23 and tapers inwardly at an intermediate section 27 from the larger inside diameter to a smaller inside diameter to terminate at a terminal section 29. Inserted into the co-axial cylindrical chamber 25 is a burner and/or injector body 31.

The main body 23 may be configured in a wide variety of shapes. Typically, it is cylindrical.

The burner and/or injector body 31 may be configured and adapted in a number of different ways: as a burner, as an injector, or as a combined burner/injector. One of ordinary skill in the art will recognize that various types of burners, injectors, and burner/injectors are known in the art and that the burner and/or injector 31 may be any of those well known structures. The burner is generally configured and adapted to inject fuel (such as natural gas, propane, or fuel oil) and an oxidant (such as air, oxygen, or air and oxygen) for combustion thereof. One type of burner/injector is generally configured and adapted to inject fuel and an oxidant or combustion thereof as well as a supersonic jet of oxygen. Another type of burner/injector is generally configured and adapted to inject fuel and an oxidant for combustion thereof as well as a stream of carbon particles. Still another type of burner/injector is generally configured and adapted to inject fuel and an oxidant for combustion thereof as well as a supersonic jet of oxygen and a stream of carbon particles. The injector may be an oxygen lance or a nozzle adapted and configured to inject a stream of carbon particles. Typical examples of burners or burner/injectors are those described by U.S. Pat. No. 5,599,375, U.S. Pat. No. 4,622,007, U.S. Pat. No. 5,788,921, and U.S. Pat. No. 5,858,302. Typical commercial examples of burners, burner/injectors, and injectors include the Pyretron™ Burner, the PyrOx Burner, and the PyreJet™ Burner or AlarcJet Nozzle available from ACI located in Kennesaw, Ga., USA. The burner, burner/injector, or injector may be made of any metal or metal alloy and may or may not be made of the same material as the flange 33 and main body 23.

The flange 33 is adapted and configured to allow up to 360° of rotation on top of plate 39. Typically, the flange 33 is cylindrical so as to allow easily rotatability through maintenance of a substantially uniform distance in between a circumferential surface thereof and the projecting stud(s) 45. Because the main body 23 projects downwardly at an angle α, the diameter of the cylindrical aperture of the plate 39 is made large enough to allow the flange 33 and main body 23 to be rotated 360° without the main body 23 impinging upon an inner surface of the opening in the water-cooled furnace panel.

The diameter of the cylindrical aperture of the plate 39 is also large enough to allow a clearance adjustment device to tip the flange 33 and main body 23 to its side, again without the main body 23 impinging upon an inner surface of the opening in the water-cooled panel. The clearance adjustment device may be a wedge 49 or any other known lever that is inserted in between flange 33 and plate 39 at any point of the circumference of the flange 33. The clearance adjustment device could also be one or more bolts that threadingly engage the flange 33 at a circumferential portion thereof and which bear against the upper surface of the plate 39. As such bolts are threaded into or out of the flange 33, the lower ends force the flange 33 away or towards from the plate 39 and thus increase or decrease the clearance at that point. Any number of these threaded bolts could be used to increase or decrease the clearance at any number of points in between the flange 33 and plate 39.

The diameter of flange 33 is greater than the diameter of the cylindrical aperture formed in plate 39 and the opening in the water-cooled furnace panel through which the apparatus 21 is installed. This difference in diameters allows the flange 33 to be rotated within the aperture without falling into the furnace. The angular orientation of the main body 23 and flange 33 may be fixed by tightening fastener(s) 47 to compress the flange 33 in between clip(s) 43 and plate 39.

One of ordinary skill in the art will recognize that the circumferential surface of flange 33 may be shaped in a wide variety of configurations. For example, while the flange 33 may still have a constant height, it may instead be configured to have multiple lobes projecting outward from the center and rotated so that one or more of the lobes are retained in between the clip(s) 43 and plate 39.

The cooling circuit may be formed in the main body 23 and flange 33 in one of two ways.

First, a portion of a metal or metal alloy pipe (such as copper or copper alloy) is bent into a helical coil. The helically-coiled pipe is inserted into and fixed to the inside of a casting form for shaping the inner body 23 and flange 33. Molten metal is poured into the casting form. After cooling, the inlet 24 and outlet 32 are formed in the surface of the cast piece in a known manner.

Second, a helically-shaped sand core of casting sand and binder is molded. The sand core is then inserted into and fixed to the inside of a casting form for shaping the inner body 23 and flange 33. Molten metal is poured into the casting form. After cooling, the casting sand is removed from the thus-shaped helical cooling circuit and the inlet 24 and outlet 32 are formed in the surface of the cast piece in a known manner.

The apparatus 21 may be installed as follows.

If not existing already, an opening is made in horizontal furnace wall 41. Plate 39 is placed over the opening in wall 41. Plate 39 is positioned to coaxially align the opening in wall 41 with the cylindrical aperture in plate 39. Plate 39 is secured to wall 41 with any means known in the art, such as, for example, with refractory plastic. The main body 23 portion of the integrally-formed main body 23 and flange 33 is extended down through the opening in wall 41 and cylindrical aperture in plate 39 with the axis 35 directed towards a desired target area for a flame or injection of a stream of oxygen or carbon particles from burner and/or injector 31. The integrally-formed main body 23 and flange 33 is then positioned to coaxially align flange 33 with the cylindrical aperture in plate 39 and the opening in the wall 41. Retaining clip(s) 43 is placed in overlapping relationship with flange 33 and fastener(s) 47 is tightened to securely hold flange 33 in between retaining clip(s) 43 and plate 39. If desired, a clearance adjustment device as described above may be utilized to adjust the clearance between the plate 39 and flange 33 in order to tip the integrally-formed main body 23 and flange 33 to desired pitch and roll angles. Burner and/or injector 31 is placed within cylindrical chamber 25 and connected, as appropriate, to valve trains for fuel and oxidant (such as oxygen, air or both oxygen and air), a valve train for oxygen, and/or to a supply of carbon particles. Finally, a source of coolant (typically water) is connected to inlet 32.

If may become apparent that, after installation, the flame, jet of oxygen, and/or stream of carbon particles is not satisfactorily directed towards the desired target area of the bath of molten metal. In that case, the apparatus 21 may be adjusted in either or both of two ways in order to achieve the desired direction. The fastener(s) 47 is loosened in order to release the grip of the retaining clip(s) 43 and plate 39 on the flange 33. The wedge 49 may be driven in between the plate 39 and the flange 33 in order to tilt the apparatus 21 from the horizontal plane of the furnace wall 41. The farther the wedge 49 is driven in between the plate 39 and flange 33, the greater the amount of tiling will be achieved. The integral main body 23 and flange 33 may also be rotated about axis 37 anywhere from 0 to 360°. Between the wedging and rotation, the desired area of the molten bath of metal may be properly targeted by the flame, jet of oxygen, and/or stream of carbon particles. Once the desired direction and targeting is achieved, the fastener(s) is tightened in order to once again secure the position of the flange 33 and main body 23 with respect to the plate 39 and furnace wall 41.

One of ordinary skill in the art will recognize how the apparatus 21 is operated. In a burner, flows of fuel (such as natural gas or fuel oil) and oxidant (such as oxygen, air, or both oxygen and air) are injected out the end of the terminal portion 29 and combust inside the furnace. In an oxygen injector (in other words, an oxygen lance), a jet of oxygen is injected out the end of the terminal portion 29 and penetrates the molten bath of metal. In the case of an EAF, the oxygen jet penetrates through the slag layer. In a carbon injector, a fluidized stream of carbon particles is injected out the end of the terminal portion 29 and penetrates the bath of molten metal, and if a layer of slag is present, penetrates through the layer of slag into the molten metal. Those skilled in the art will further understand how apparatus 21 will operate when a combination of burner and oxygen injector, burner and carbon particle injector, or burner, oxygen injector, and carbon particle injector is selected.

The present invention yields several advantages. First, because the end of the main body 23 projects relatively far from the furnace wall 41, the flame, jet of oxygen, and/or stream of carbon particles is more coherent. In the case of an oxygen jet or stream of carbon particles, they are better able to penetrate into and through the slag or molten bath of metal. Many conventional devices have ends that are flush with the furnace wall 41 thereby sacrificing potential coherent reach of the flame, jet of oxygen, or stream of carbon particles. Second, the burner and/or injector 31 is better cooled because the cooling circuit extends 360° around the cylindrical chamber 25 instead of traversing only on one side thereof in a serpentine manner like conventional burner/injector panels. Third, when the main body 23 has a cylindrical configuration, the apparatus 21 absorbs less heat from the furnace because of the optimized surface to volume ratio afforded by a cylinder. Fourth, the apparatus 21 yields the ability to heat or inject oxygen or carbon particles into practically any spot within the reach of the flame, jet of oxygen, or stream of carbon particles. This is due to its ability to be tilted and/or rotated. Conventional burner and/or injectors have a fixed position once they are installed at the furnace wall 41. This fixed position is not alterable unless the opening in the furnace wall 41 is significantly modified. This is because their square or rectangular configuration does not allow rotation within the square or rectangular opening in the furnace wall 41.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A metal melting furnace panel apparatus for a burner and/or for an injector, said panel apparatus comprising:
   a horizontal plate having a lower surface, an upper surface, and a vertically oriented cylindrical aperture extending through said upper and lower surfaces;
   a horizontally extending flange having a uniform height along its periphery and having a vertically extending axis, a width or diameter of said flange being greater than a diameter of said cylindrical aperture;
   a main body integrally formed with said flange and extending downwardly therefrom along a main body axis at an angle to a vertical axis of said flange, said main body having a centrally disposed cylindrical chamber extending upper and lower ends thereof, said integrally formed flange and main body being operatively associated with said plate such that:
   in operation, said flange rests atop said plate while said main body projects downwardly though said cylindrical aperture,
   when said flange is rotated atop said plate around the flange's vertically extending axis, because said flange is integrally formed with said main body, said main body is rotated within said cylindrical aperture,
   said plate is adapted and configured to retain said plate in fixed position; and
   a burner and/or injector inserted in said main body cylindrical chamber adapted and configured to inject therefrom at least one of a flame, a jet of oxygen, and a stream of carbon particles.

2. The metal melting furnace panel apparatus of claim 1, further comprising:
   one or more fasteners; and
   one or more retaining clips corresponding to said one or more fasteners, wherein said plate further comprises one or more studs corresponding to said one or more retaining clips upwardly projecting from an upper surface of said plate, said clips being adapted and configured to be fastened to said studs with said fasteners so as to fixedly secure said flange between said plate and said one or more clips.

3. The metal melting furnace panel apparatus of claim 1, wherein said main body has a cylindrical configuration coaxial with said cylindrical chamber.

4. The metal melting furnace panel apparatus of claim 1, wherein said flange has a cylindrical configuration and said flange diameter is greater than a diameter of said cylindrical aperture.

5. The metal melting furnace panel apparatus of claim 1, wherein said burner and/or injector comprises a burner.

6. The metal melting furnace panel apparatus of claim 1, wherein said burner and/or injector comprises an oxygen injector.

7. The metal melting furnace panel apparatus of claim 1, wherein said burner and/or injector comprises a burner and an oxygen injector.

8. The metal melting furnace panel apparatus of claim 1, wherein said burner and/or injector comprises a carbon particle injector.

9. The metal melting furnace panel apparatus of claim 1, wherein said burner and/or injector comprises a burner and a carbon particle injector.

10. The metal melting furnace panel apparatus of claim 1, wherein said burner and/or injector comprises a burner, an oxygen injector, and a carbon particle injector.

11. A metal melting furnace panel apparatus for a burner and/or for an injector, said panel apparatus comprising:
    a horizontal plate having a lower surface, an upper surface, and a vertically oriented cylindrical aperture extending through said upper and lower surfaces;
    a horizontally extending flange having a uniform height along its periphery and having a vertically extending axis, a width or diameter of said flange being greater than a diameter of said cylindrical aperture;
    a main body integrally formed with said flange and extending downwardly therefrom along a main body axis at an angle to a vertical axis of said flange, said main body having a centrally disposed cylindrical chamber extending upper and lower ends thereof, said integrally formed flange and main body being operatively associated with said plate such that:
    in operation, said flange rests atop said plate while said main body projects downwardly though said cylindrical aperture,
    when said flange is rotated atop said plate around the flange's vertically extending axis, because said flange is integrally formed with said main body, said main body is rotated within said cylindrical aperture,
    said plate is adapted and configured to retain said plate in fixed position; and
    a burner and/or injector inserted in said main body cylindrical chamber adapted and configured to inject therefrom at least one of a flame, a jet of oxygen, and a stream of carbon particles, wherein said integrally formed flange and main body include a cooling circuit having a helically shaped portion in said main body extending around said cylindrical chamber.

12. An electric arc furnace installation, comprising:
    a furnace having a hearth adapted and configured to contain a bath of molten metal;
    a sump region with a tap hole;
    sidewalls extending upwardly and around said hearth and sump region;
    a balcony panel extending horizontally over said sump region and having a cylindrical opening; and
    the metal melting furnace panel apparatus of claim 1, said plate being secured to an exterior surface of said balcony panel and said cylindrical aperture is aligned with said balcony panel cylindrical opening, said main body extending downwardly through said balcony panel cylindrical opening.

* * * * *